United States Patent [19]
Sugiura

[11] Patent Number: 5,860,757
[45] Date of Patent: Jan. 19, 1999

[54] BALL JOINT

[75] Inventor: Hironobu Sugiura, Yokohama, Japan

[73] Assignee: NHK spring Co., Ltd., Japan

[21] Appl. No.: 826,060

[22] Filed: Mar. 24, 1997

Related U.S. Application Data

[62] Division of Ser. No. 526,512, Sep. 11, 1995, Pat. No. 5,697,142.

[30] Foreign Application Priority Data

Sep. 12, 1994 [JP] Japan .................................. 6-217406

[51] Int. Cl.$^6$ ....................................................... F16C 11/08
[52] U.S. Cl. .............................. 403/131; 403/128; 403/50
[58] Field of Search ...................... 403/131, 130, 403/128, 50, 23; 29/423, 527.4, 898.052, 898.053, 898.043, 898; 264/242, 273, 261, 262, 271.1; 156/242, 245; 227/212 FB

[56] References Cited

U.S. PATENT DOCUMENTS

| | | | |
|---|---|---|---|
| 1,853,122 | 4/1932 | Flumerfelt | 403/131 |
| 1,919,797 | 7/1933 | Maurer | 403/131 |
| 3,023,038 | 2/1962 | White | 29/898.052 X |
| 3,329,454 | 7/1967 | Melton et al. | 403/130 X |
| 3,342,513 | 9/1967 | Melton et al. | 403/130 X |
| 3,959,872 | 6/1976 | Abe | 29/527.4 |
| 4,572,693 | 2/1986 | Nemoto | 403/50 X |
| 4,629,352 | 12/1986 | Nemoto | 403/128 |
| 4,758,110 | 7/1988 | Ito | 403/140 |
| 4,954,006 | 9/1990 | Suzuki et al. | 403/135 |
| 5,011,321 | 4/1991 | Kidokoro | 403/140 |
| 5,044,811 | 9/1991 | Suzuki et al. | 403/134 |
| 5,489,161 | 2/1996 | Sugita et al. | 403/119 |
| 5,611,635 | 3/1997 | Schutt et al. | 403/130 X |
| 5,615,967 | 4/1997 | Hellon | 403/133 |

FOREIGN PATENT DOCUMENTS

| | | |
|---|---|---|
| 0 479 598 A2 | 4/1992 | European Pat. Off. . |
| A 1 091 445 | 4/1955 | France . |
| A 1 226 195 | 7/1960 | France . |
| A 1 226 331 | 7/1960 | France . |
| A 1 312 822 | 11/1962 | France . |
| 2436279 | 5/1980 | France ................................. 403/130 |
| C 619 347 | 9/1935 | Germany . |
| C 854 731 | 11/1952 | Germany . |
| 794611 | 5/1958 | United Kingdom ................... 403/130 |
| A 2 159 207 | 11/1985 | United Kingdom . |

*Primary Examiner*—Anthony Knight
*Attorney, Agent, or Firm*—Pennie & Edmonds LLP

[57] ABSTRACT

A ball joint comprises a metallic stud bolt having a male screw on one end side and a spread portion on the other end side, a resin ball member of synthetic resin having a spherical portion covering the spread portion, and a ball seat of synthetic resin having a spherical recess in which the spherical portion is fitted for relative rotation and rocking motion. A nut is fitted on the male screw. A noncircular detent portion including serrations or the like is formed on the outer peripheral surface of the spread portion. A flange portion is formed integral with the stud bolt on the intermediate portion in the axial direction. The resin ball member has a cylindrical portion integral with it, and a dust cover fixing projection is formed integral with the cylindrical portion. An end portion of a dust cover is held between the projection and the flange portion.

5 Claims, 4 Drawing Sheets

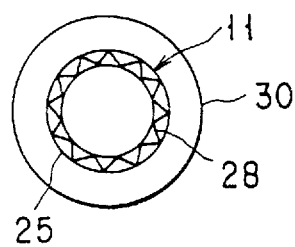
F I G. 4
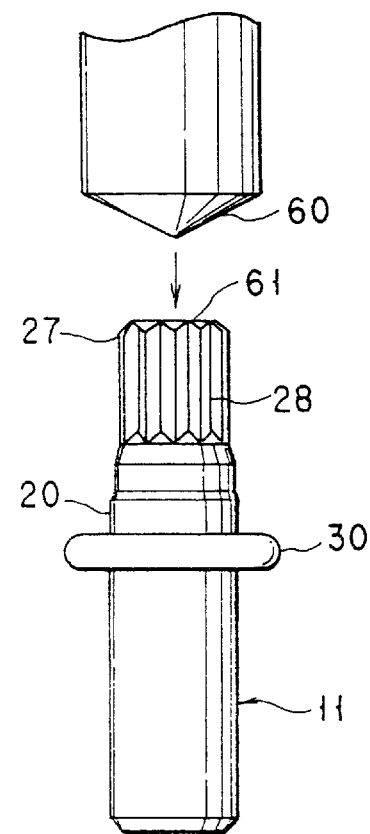
F I G. 5
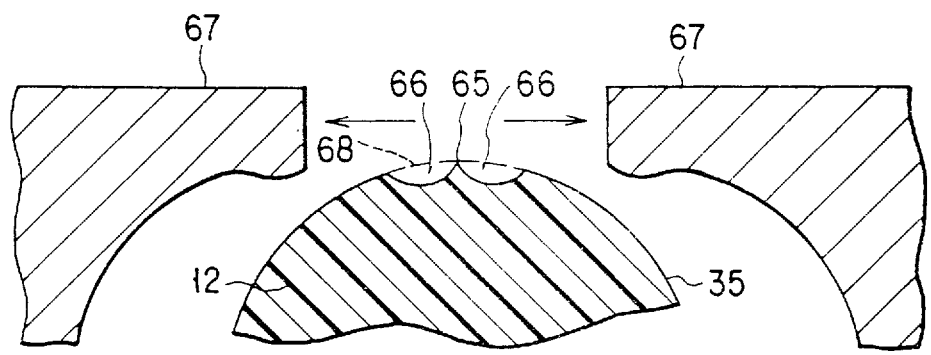
F I G. 6

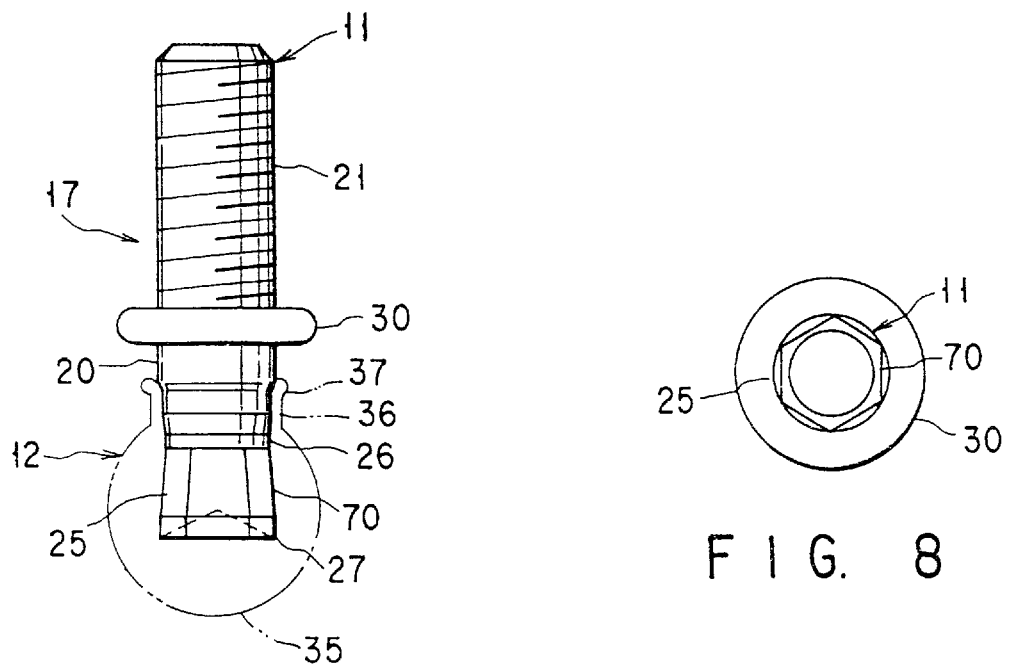
FIG. 7
FIG. 8
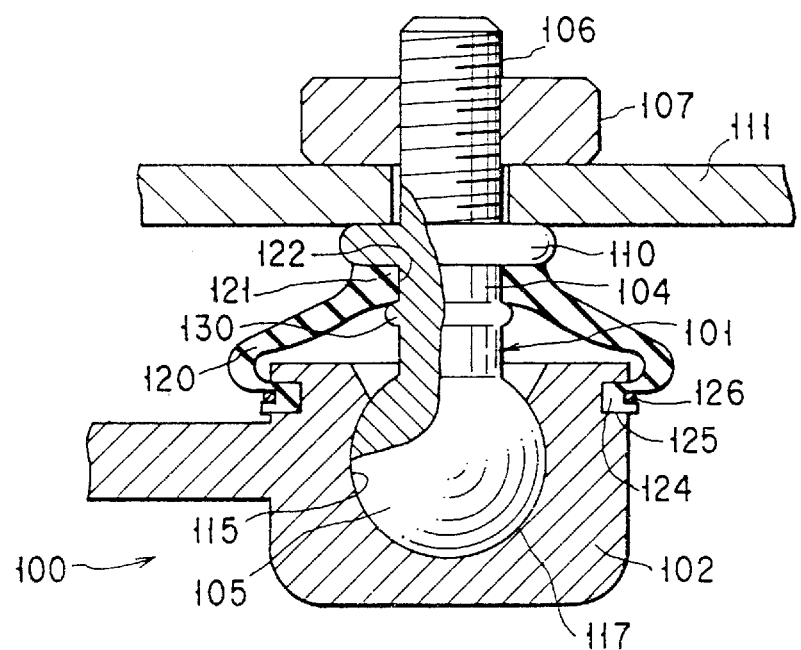
(PRIOR ART)
FIG. 9

BALL JOINT

This a divisional of application Ser. No. 08/526,512, filed Sep. 11, 1995 now U.S. Pat. No. 5,697,142.

BACKGROUND OF THE INVENTION

1. Field of the Invention

The present invention relates to a ball joint used to connect two relatively moving parts for rotation and rocking motion and a manufacturing method thereof.

2. Description of the Related Art

A ball joint is described in Jpn. Pat. Appln. KOKAI Publication No. 5-346114, for example. This ball joint is used to connect two relatively moving parts for rotation and rocking motion, at a joint between a stabilizer and a shock absorber or between the stabilizer and a suspension arm, in a vehicular suspension system, for example.

A conventional ball joint 100 shown in FIG. 9 comprises a metallic ball stud 101, a ball seat 102, etc. The ball stud 101 includes a shank portion 104, a spherical portion 105 on one end side of the shank portion, and a male screw 106 on the other end side of the shank portion. A nut 107 is screwed on the male screw 106. The ball stud 101 has a collar-shaped flange portion 110 on its intermediate portion in the axial direction. The nut 107 is tightened in a manner such that a mating member 111 is sandwiched between the flange portion 110 and the nut 107. The spherical portion 105 is fitted in a spherical recess 115 in the ball seat 102 so as to be freely slidable in the circumferential direction. Thus, the ball stud 101 can oscillate (or rock) with respect to the ball seat 102 and rotates around its axis at the same time.

The flange portion 110 may be formed integral with the shank portion 104 of the ball stud 101, as shown in FIG. 9, or fixed to the shank portion 104 by using fixing means, such as a nut independent of the shank portion 104 and screwed on the male screw 106, or a ring-shaped component press-fitted on the ball stud 101.

Conventionally, the shank portion 104 and the spherical portion 105 are formed integral with each other by forging or cutting work. In general, the sphericity and surface roughness of the spherical portion 105 both require high accuracy to ensure smooth rotation and oscillation of the ball stud 101.

Usually, a lubricant such as grease is applied to sliding surfaces 117 of the ball seat 102 and the spherical portion 105. A dust cover 120 is provided for preventing the lubricant from flowing out from between the sliding surfaces 117 and preventing dust or other foreign matter from penetrating into the gap between the surfaces 117 and wearing them. The dust cover 120 is formed of a flexible material such as rubber, and can flexibly follow the rotation and oscillation of the ball stud 101.

A circular hole 122 with a diameter smaller than the outside diameter of the shank portion 104 is formed in an end portion 121 of the dust cover 120, and the shank portion 104 is passed through the hole 122, whereby the cover 120 is mounted on the ball stud 101. In this case, the end portion 121 is fixed and sealed in a manner such that the inner peripheral surface of the hole 122 is intimately in contact with the shank portion 104. The other end portion 124 of the dust cover 120 is fitted in a ring-shaped groove 125 in the outer peripheral portion of the ball seat 102. The end portion 124 is fixed and sealed in a manner such that it is retained on the ball seat 102 by means of the elasticity of the cover 120 itself or by using an auxiliary fixing member 126, such as a snap ring. In some cases, necessary sealing properties may be secured by fitting a rubber ring or the like on the dust cover 120 in a region near the hole 122 and supplementally tightening it.

In the conventional ball joint 100 having the dust cover 120 constructed in this manner, part of the dust cover 120 is strongly pulled by the elastic force of the cover 120 when the ball stud 101 is inclined at a wide angle around the spherical portion 105. As a result, the position of the end portion 121 of the dust cover 120 is shifted by the elastic limit of the cover 120, possibly causing penetration of dust or other foreign matter.

To avoid this, the shank portion 104 is provided with a projection 130 for fixing the dust cover 120, designed so that the end portion 121 of the cover 120 is held between the projection 130 and the flange portion 110. It is empirically known that the projection 130 is needed when the maximum rocking angle of the ball stud 101 with respect to the ball seat 102 exceeds 20°, and that the projection 130 has an effect if its height is about 1 mm or more.

As mentioned before, the ball stud 101 must include the shank portion 104 as a basic structure and the three projecting portions (i.e., spherical portion 105, flange portion 110, and dust cover fixing projection 130). Normally, the ball stud 101 is formed of steel or some other metal which ensures a necessary strength for a mechanical element. Since the spherical portion 105 of the ball stud 101 requires high accuracy, as mentioned before, that part of the ball stud 101 which ranges from the flange portion 110 to the spherical portion 105 is conventionally worked by machining such as cutting, and the surface of the spherical portion 105 is further burnished for higher accuracy. The machining requires much time and labor, thus entailing high manufacturing cost.

Cold forging is a prevailing method for manufacturing the ball stud 101 at low cost. In fabricating the ball stud 101 by the cold forging, at least two separate upsetting dies 140 and 141 are used in the manner shown in FIG. 10. The spherical portion 105 is formed by striking the material of the ball stud 101 by means of the dies 140 and 141. In this case, the forged ball stud 101 inevitably suffers a parting line 145 or a minute continuous projection extending in the circumferential direction of the spherical portion 105 along the respective mating faces of the dies 140 and 141. The parting line 145 shown in FIG. 11 is exaggerated in form.

In forming the flange portion 110, moreover, the ball stud 101 is forged under pressure applied thereto in its axial direction from above by means of the die 152 in a manner such that the spherical portion 105 is held between split dies 150 and 151, as shown in FIG. 12. Also in this case, the surface of the spherical portion 105 suffers a minute projection or parting line 155 extending along the respective mating faces of the left- and right-hand split dies 150 and 151. Alternatively, the spherical portion 105 may be formed after forming the flange portion 110 first. Since this method also requires use of similar split dies, a parting line is an unavoidable product.

The parting lines 145 and 155 worsen the sphericity of the spherical portion 105 and the sealing properties of the dust cover 120 at its opposite end portions 121 and 124. As a result, foreign matter gets into the gap between the respective sliding surfaces 117 of the spherical portion 105 and the ball seat 102, thereby wearing the sliding surfaces 117 wear extraordinarily, so that the ball joint cannot fulfill its function.

Although the parting lines 145 and 155 can be removed by cutting or burnishing work depending on the height of their projections, this machining work entails an increase in cost. The lateral split dies 150 and 151 shown in FIG. 12 cannot be attached to a conventional multistage parts forming machine. Inevitably, therefore, the flange portion 110 must be forged in a process separate from the process for forming the spherical portion 105 by means of the dies 140 and 141 shown in FIG. 10, thus resulting in higher cost.

In general, a low-profile projection, such as the dust cover fixing projection 130, cannot be forged on account of the relationship between the necessary forging pressure for the formation of the projection and the size and shape of a workpiece (ball stud 101). Conventionally, therefore, the small projection 130 is bound to be formed by cutting work by means of cutting tools, thus entailing an increase in cost.

SUMMARY OF THE INVENTION

Accordingly, the object of the present invention is to provide a ball joint which can be easily manufactured at low cost and a manufacturing method therefor.

In order to achieve the above object, a ball joint according to the present invention comprises: a metallic stud bolt having a male screw formed on one end side thereof and a small-diameter portion and a spread portion on the other end side, the spread portion being wider than the small-diameter portion; a resin ball member of synthetic resin having a spherical portion covering the spread portion of the stud bolt, the center of the spherical portion being situated on the axis of the stud bolt; a ball seat having a spherical recess in which the spherical portion of the resin ball member is fitted for relative rotation and rocking motion; and a dust cover stretched between the stud bolt and the ball seat.

The resin ball member is formed of a thermosetting or thermoplastic resin. Available thermosetting resins include phenol resin, epoxy resin, melamine resin, etc., while thermoplastic resins include polyphenylene sulfide (PPS resin), polybutylene terephthalate (PBT resin), polyethylene terephthalate (PET resin), acrylonitrile-styrene resin (AS resin), acrylonitrile-butadiene-styrene resin (ABS resin), acrylonitrile-styrene acrylic resin (ASA resin), polyethylene, polymethyl methacrylate, polypropylene, polystyrene, polyvinyl chloride, nylon, polyacetal, polycarbonate, polysulfone, polyimide, polyamide-polyimide resin, etc.

Preferably, in the ball joint according to the present invention, a collar-shaped flange portion is formed integral with the shank portion of the stud bolt on the intermediate portion thereof in the axial direction so that a mating member is held between the flange portion and a nut screwed on the male screw. Moreover, the resin ball member may be provided with a cylindrical portion which covers the intermediate portion of the shank portion of the stud bolt in the axial direction, and is formed integral with a dust cover fixing projection. In this case, the dust cover can be fixed in a manner such that its end portion is held between the flange portion and the fixing projection. The relative rotation of the stud bolt and the resin ball member may be effectively prevented by providing noncircular detent means, such as serrations or a structure having a polygonal cross section, on the outer peripheral surface of the spread portion of the stud bolt.

A manufacturing method for a ball stud for a ball joint according to the present invention comprises the steps of: manufacturing a metallic stud bolt by forming a male screw on the one end side and noncircular detent means, such as serrations or a structure having a polygonal cross section, on the other end side; spreading an end portion of the stud bolt to form a spread portion by pressurizing an end face of the stud bolt by means of a sharp-pointed punch; and forming a resin ball member having a spherical portion by setting a region of the stud bolt including the spread portion in molds for injection molding and injecting a synthetic resin material into the molds.

Basically, only a compressive load is applied to the surface region of the spherical portion when the ball joint is actually used. Therefore, the spherical portion has no problem of strength if it is formed of resin. The dust cover fixing projection has no problem either, since it is only subjected to a reaction force of the elasticity of the dust cover when the ball stud is inclined with respect to the ball seat.

The spread portion of the stud bolt is embedded in the resin ball member. Even though the ball stud is subjected to a load in its axial direction, therefore, it cannot slip out of the resin ball member. If the spread portion is provided with the detent means such as serrations, moreover, the stud bolt and the resin ball member can be prevented from being caused to rotate relatively to each other by a rotatory force which acts on the ball stud.

The resin ball member is fabricated by injection molding. More specifically, it can be obtained by subjecting the synthetic resin material to injection molding in a manner such that the region of the stud bolt including the spread portion is inserted in the molds. Since the pressure produced during the process of injection molding is much lower than the forging pressure, the resin ball member can be manufactured much more easily than the conventional metallic spherical portion which requires forging. In providing the dust cover fixing projection integral with the resin ball member, it can be formed simultaneously with the ball member during its injection molding. Thus, the fixing projection can be obtained more easily than the conventional one which is formed by cutting work.

According to the present invention, the spherical portion of the ball stud is formed by resin injection molding. As compared with the conventional ball stud which is formed entirely of metal, therefore, the ball stud of the invention can be formed in an extremely short period of time without the problem of a parting line. Also, according to the invention, the ball stud can be manufactured in fewer process steps without requiring any substantial finishing work, and the dies and molds used may be relatively simple ones. Thus, the manufacturing cost can be reduced. Formed of resin, moreover, the spherical portion of the ball stud is light in weight. Since the dust cover fixing projection, which need not be very strong, can be formed integral with the spherical portion from resin, furthermore, the manufacturing method of the invention requires none of the machining operations, such as cutting, which are essential to the manufacture of the conventional metallic ball stud.

BRIEF DESCRIPTION OF THE DRAWINGS

FIG. 4 is a bottom view of the stud bolt shown in FIG. 3;

FIG. 5 is a side view showing a punch for forming a spread portion and the stud bolt without the spread portion;

FIG. 6 is a sectional view showing part of a resin ball member and parts of molds;

FIG. 7 is a side view showing a modification of the stud bolt;

FIG. 8 is a bottom view of the stud bolt shown in FIG. 7;

FIG. 9 is a sectional view showing a conventional ball joint;

DETAILED DESCRIPTION OF THE PREFERRED EMBODIMENTS

Referring now to FIGS. 1 to 5, an embodiment of the present invention will be described.

Figure 1:
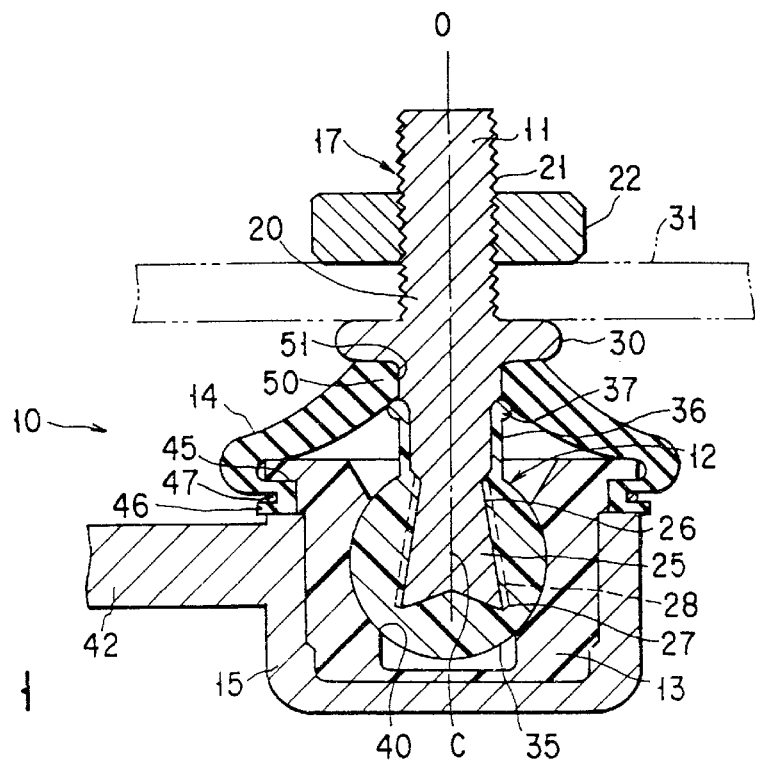
FIG. 1 is a longitudinal sectional view of a ball joint according to an embodiment of the present invention.
Figure 2:
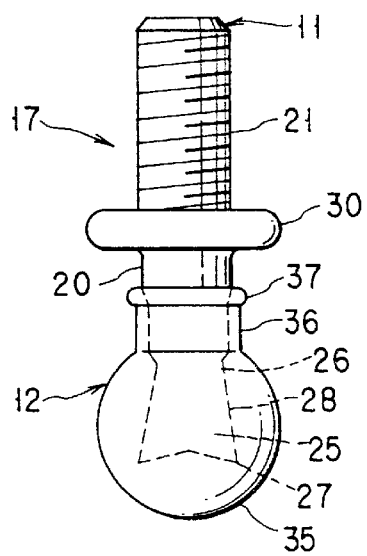
FIG. 2 is a side view of a ball stud of the ball joint shown in FIG. 1.

A ball joint 10 shown in FIG. 1 comprises a stud bolt 11 formed of steel or some other metal, a resin ball member 12 formed of synthetic resin, a resin ball seat 13, a rubber dust cover 14, etc. The ball seat 13 is housed in a metallic housing 15. The stud bolt 11 and the resin ball member 12 constitute a ball stud 17, as shown in FIG. 2. The dust cover 14 is stretched between the stud bolt 11 and the ball seat 13.

A male screw 21 is formed on the outer peripheral surface of a shank portion 20 on one end side thereof. A nut 22 is screwed on the male screw 21. A spread portion 25 is provided on the other end side of the stud bolt 11. The spread portion 25 is a fan-shaped portion which spreads from a small-diameter portion 26 toward a distal end portion 27. The stud bolt 11 has an axis O which passes through the respective centers of the male screw 21, small-diameter portion 26, and spread portion 25.

Figure 3:
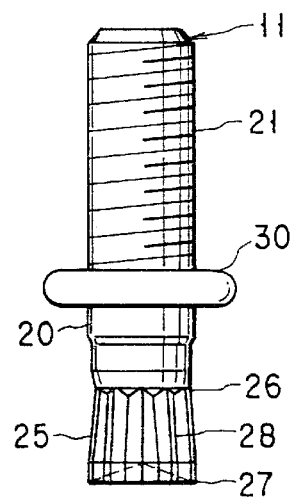
FIG. 3 is a side view of a stud bolt used in the ball stud shown in FIG. 2.
Figure 10:
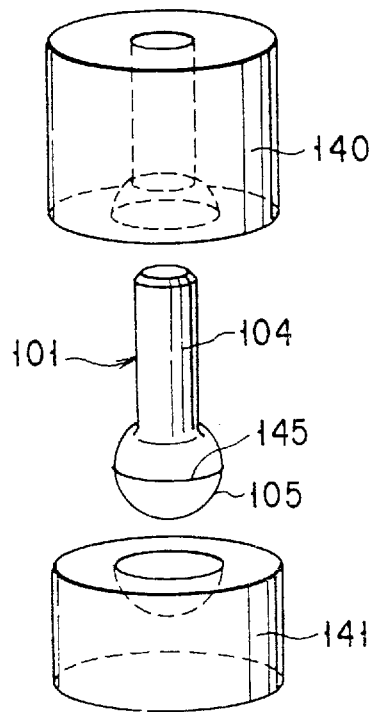
FIG. 10 is a perspective view showing dies for working a conventional ball stud.
Figure 11:
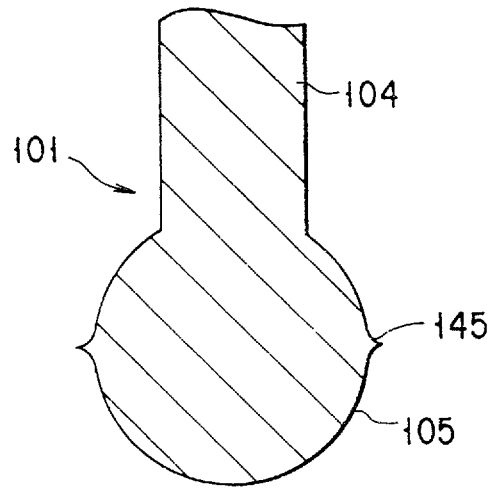
FIG. 11 is a sectional view showing a parting line produced on the conventional ball stud.
Figure 12:
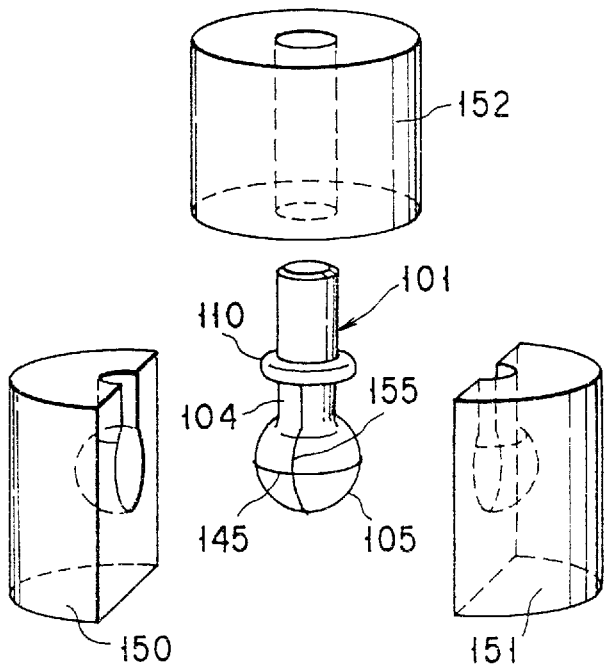
FIG. 12 is a perspective view showing conventional dies for working a flange portion.

Provided on the outer peripheral surface of the spread portion 25, as shown in FIG. 3, is a noncircular detent portion 28 which have indentations, such as serrations or splines, arranged in the circumferential direction. In other words, the detent portion 28 has a shape such that the distance from the axis O of the stud bolt 11 varies in the circumferential direction. Thus, the cross-sectional shape of the detent portion 28 may be any noncircular shape, e.g., polygonal shape, other than the serrated one. For the following reason, a favorable cross-sectional shape of the detent portion 28 in the diametrical direction of the bolt 11 is a serrated configuration which is similar to the shape of a circle. If the wall thickness of the resin ball member 12 around the detent portion 28 varies extremely, the resin is liable to shrink unevenly as it solidifies, so that the shape of the ball member 12 is lowered in accuracy.

A collar-shaped flange portion 30 is formed on the intermediate portion of the stud bolt 11 in the axial direction thereof so as to be integral with the shank portion 20. The nut 22 is tightened in a manner such that a mating member 31 is sandwiched between the flange portion 30 and the nut 22, whereby the stud bolt 11 is fixed to the member 31.

The resin ball member 12 includes a spherical portion 35 formed of any one of the aforementioned thermosetting or thermoplastic synthetic resins and a cylindrical portion 36 formed integral with the spherical portion 35. The spherical portion 35 covers the spread portion 25 and the small-diameter portion 26. The spherical portion 35 has its center C situated on the axis (center line) O of the stud bolt 11. The cylindrical portion 36 is shaped so as to surround the part of the shank portion 20 throughout the circumference. A projection 37 for fixing the dust cover 14 is formed integral with the distal end of the cylindrical portion 36.

The ball seat 13 is formed having a spherical recess 40 in which the spherical portion 35 is fitted for rotation and rocking motion. The housing 15 which contains the ball seat 13 therein securely fixes the seat 13 lest it rotate relatively to the seat 13 and lest the seat 13 slip out of the housing 15. The ball seat 13 may be fixed to the housing 15 by being press-fitted into the housing 15 or by means of an adhesive agent, for example. Alternatively, the ball seat 13 may be fixed to the housing 15 by any other suitable fixing means, such as a combination of a projection on the seat 13 and a through hole in the housing 15. In this case, the projection is passed through the hole and then deformed by heat. The housing 15 is provided with a rod-shaped frame 42 (only part of which is shown).

A continuous circumferential annular groove 45 is formed on the edge portion of the ball seat 13, and one end portion 46 of the dust cover 14 is fitted in the groove 45. An auxiliary fixing member 47, such as a snap ring, is fitted on the end portion 46 of the cover 14 so that the end portion 46 can be fixed to the ball seat 13 and sealed securely.

The shank portion 20 of the stud bolt 11 is passed through a hole 51 which is formed in the other end portion 50 of the dust cover 14. The end portion 50 is fixed and sealed securely in a manner such that the end portion 50 of the dust cover 14 is held between the flange portion 30 and the projection 37. The projection 37 serves to prevent the position of the end portion 50 of the dust cover 14 from shifting as the stud bolt 11 rocks with respect to the ball seat 13.

The flange portion 30 requires a sizable strength, since it is subjected to a bending moment by a load which acts between the member 31 and the frame 42 during use of the ball joint 10. Since the flange portion 30 according to this embodiment is a metallic part formed integral with the shank portion 20, it can exhibit a satisfactory strength against the bending moment.

In contrast with this, the surface of the spherical portion 35 is only subjected to a compressive load, basically. Normally, the dust cover fixing projection 37 only receives a reaction force from the rubber of the dust cover 14 when the ball stud 17 rocks. Thus, the spherical portion 35 and the projection 37 may be lower in strength than the shank portion 20 and the flange portion 30. For this reason, the resin ball member 12, which includes the spherical portion 35, cylindrical portion 36, and projection 37, is integrally formed of synthetic resin.

The following is a description of a method for manufacturing the ball stud 17 according to the embodiment described above. This manufacturing method generally comprises four processes; a forging process for fabricating the stud bolt 11 from a metallic material, a heat treatment process for heat-treating the stud bolt 11, a thread rolling process for forming the male screw 21, and a resin molding process for forming resin ball member 12 by injection molding.

The stud bolt 11 is subjected to multistage cold forging in the forging process. In this case, the basic structure of the shank portion 20 and the flange portion 30 are formed by pressurizing a rod-shaped metallic material, set in upsetting dies, in its axial direction. Also, the detent portion 28 is made up in the form of serrations or the like. As shown in FIG. 5, moreover, an end face 61 of the stud bolt 11 is pressurized by means of a sharp-pointed punch 60 having the shape of a circular cone or pyramid, whereby the distal end portion 27 of the stud bolt 11 is spread. In this manner, the spread portion 25 can be formed with a small punching force. The spread portion 25, which is finally covered by the resin, need not have an accurate shape, so that its side face need not be restricted by means of split dies. Thus, the entire forging process can be carried out in a parts forming machine.

In the heat-treatment process, thereafter, the stud bolt 11 is subjected to heat treatments, such as quenching, tempering, etc., to be refined for a predetermined hardness. In the thread rolling process, moreover, the male screw 21 is formed by rolling, whereupon the stud bolt 11 is completed.

In the resin molding process, the resin ball member 12 is formed by setting a region including the spread portion 25 of the stud bolt 11 (insert metal) in molds for injection molding and injecting a synthetic resin material into the molds. This is insert molding as it is called. The dust cover fixing projection 37 is formed integral with the resin ball member 12 when the member 12 is formed.

According to the present embodiment, basic profiling of the stud bolt 11 can be accomplished substantially in one stage by means of the parts forming machine. Since the ball stud manufacturing processes from the forging process to the resin molding process are only four in number, moreover, the ball stud can be manufactured at low cost. In manufacturing the conventional metallic ball stud 101 (shown in FIG. 9), in contrast with this, the formation of the spherical portion 105, flange portion 110, male screw 106, etc. requires at least six processes.

In the resin molding process, the injection molding of the resin ball member 12 requires use of lateral or vertical split molds. In this case, a parting line is an unavoidable problem. However, the pressure required for the injection molding of resin is so low that it makes no comparison with the pressure for the forging process. In the case of the present embodiment where the spherical portion 35 is formed from resin, therefore, the parting line produced during the injection molding can be reduced to a practically negligible size by improving the accuracy of the molds.

If a projecting parting line 65 is inevitably produced on account of the kind of the resin used or the like, undercut molds 67 (shown only partially in FIG. 6) may be used to form shallow recesses 66 on either side of the parting line 65, as shown exaggeratedly in FIG. 6, so that the projecting top of the line 65 does not projects above an arcuate extension 68 of the surface of the spherical portion 35. Since the elastic modulus of the spherical portion 35 of resin is much lower than that of metal, the molds 67 can be disengaged from the spherical portion 35 despite the presence of the recesses (undercuts) 66.

A detent effect may be obtained between the stud bolt 11 and the resin ball member 12 by using a spread portion 25 which has a detent portion 70 with a polygonal cross section, e.g., hexagonal or octagonal, as shown in FIGS. 7 and 8. The arrangements, functions, and effects of other components are the same as the case of the foregoing embodiment (FIGS. 1 to 5). The spread portion 25 of the stud bolt 11 of FIG. 7 is also formed by spreading the distal end portion 27 by means of the cone-shaped punch 60 (shown in FIG. 5) described in connection with the foregoing embodiment.

What is claimed is:

1. A ball joint comprising:

a metallic stud bolt having one end and the other end and formed with a male screw on one end side thereof and a small-diameter portion and a non spherical spread portion on the other end side, the spread portion being wider than the small-diameter portion, the stud bolt having an axis passing through the respective centers of the male screw, small-diameter portion, and spread portion;

a nut screwed on the male screw of the stud bolt;

detent means formed on the outer peripheral surface of the spread portion;

a flange portion formed integral with the stud bolt on the intermediate portion thereof in the axial direction;

a resin ball member of synthetic resin having a spherical portion covering the spread portion, the center of the spherical portion being situated on the axis of the stud bolt;

a ball seat of synthetic resin having a spherical recess in which the spherical portion of the resin ball member is fitted for relative rotation and rocking motion;

a dust cover stretched between the stud bolt and the ball seat, a cylindrical portion formed integral with the spherical portion of the resin ball member so as to cover the intermediate portion of the stud bolt in the axial direction;

a dust cover fixing projection formed on the distal end of the cylindrical portion so as to be integral therewith, whereby an end portion of the dust cover is held between the flange portion and the fixing projection; and a metallic housing containing and fixing the ball seat.

2. A ball joint according to claim 1, wherein said spread portion of said stud bolt is provided on the outer peripheral surface thereof with detent means such that the distance from the axis of the stud bolt varies in the circumferential direction.

3. A ball joint according to claim 2, wherein said detent means includes serrations formed on the outer peripheral portion of the stud bolt.

4. A ball joint according to claim 2, wherein said detent means includes the outer peripheral portion of the stud bolt having a polygonal cross section in a direction perpendicular to the axis.

5. A ball joint according to claim 1, further comprising a metallic housing containing and fixing the ball seat.

* * * * *